US010508937B2

(12) United States Patent
Dabak et al.

(10) Patent No.: US 10,508,937 B2
(45) Date of Patent: Dec. 17, 2019

(54) ULTRASONIC FLOW METER

(71) Applicant: Texas Instruments Incorporated, Dallas, TX (US)

(72) Inventors: Anand Dabak, Plano, TX (US); Clive Bittlestone, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/860,409

(22) Filed: Apr. 10, 2013

(65) Prior Publication Data

US 2014/0305215 A1 Oct. 16, 2014

Related U.S. Application Data

(60) Provisional application No. 61/623,229, filed on Apr. 12, 2012.

(51) Int. Cl.
| | | |
|---|---|---|
| *G01F 1/66* | (2006.01) | |
| *G01F 15/06* | (2006.01) | |
| *H04Q 9/00* | (2006.01) | |

(52) U.S. Cl.
CPC ............ *G01F 1/66* (2013.01); *G01F 1/667* (2013.01); *G01F 15/061* (2013.01); *H04Q 9/00* (2013.01); *H04Q 2209/60* (2013.01)

(58) Field of Classification Search
CPC ......... G01F 1/667; G01F 1/662; G01N 17/00; H04B 11/00
USPC .................. 73/592, 865.8, 861.21–861.31
See application file for complete search history.

(56) References Cited

U.S. PATENT DOCUMENTS

| | | | | |
|---|---|---|---|---|
| 4,045,767 A | * | 8/1977 | Nishihara | ............... H04L 27/30 324/76.31 |
| 4,162,635 A | * | 7/1979 | Triplett | ............. G01N 29/2481 73/623 |
| 4,320,666 A | * | 3/1982 | Redding | ................. G01P 5/248 73/861.28 |
| 4,336,719 A | * | 6/1982 | Lynnworth | ............. G01F 1/667 73/861.27 |
| 4,483,202 A | * | 11/1984 | Ogura | ..................... G01F 1/667 73/861.27 |
| 4,581,942 A | * | 4/1986 | Ogura | .................. A61M 16/08 73/861.04 |
| 5,372,047 A | * | 12/1994 | Russwurm | ............. G01F 1/662 73/861.27 |
| 5,460,047 A | * | 10/1995 | Jacobson | ................ G01F 1/662 73/597 |

(Continued)

OTHER PUBLICATIONS

Hayes, H. D.; Akerman, M. A.; Baylor, V. M. "Final Report, Ultrasonic Communication Project, Phase 1, FY 1999," National Security Program Office, Jun. 2000, 115 pages.

(Continued)

*Primary Examiner* — Harshad R Patel
*Assistant Examiner* — Tran M. Tran
(74) *Attorney, Agent, or Firm* — Kenneth Liu; Charles A. Brill; Frank D. Cimino

(57) ABSTRACT

A flow meter ultrasonically measures fluid velocity in a pipe and ultrasonically transmits fluid flow data along the pipe. An ultrasonic transducer used for fluid velocity measurement may optionally also be used for communication of flow data, and optionally, the ultrasonic frequency for fluid velocity measurement may be the same as the ultrasonic frequency for communication of flow data.

16 Claims, 2 Drawing Sheets

(56) References Cited

U.S. PATENT DOCUMENTS

| | | | | |
|---|---|---|---|---|
| 5,546,359 A * | 8/1996 | Aarseth | | E21B 47/18 367/134 |
| 5,639,972 A * | 6/1997 | Hastings | | G01F 1/662 374/117 |
| 6,127,942 A * | 10/2000 | Welle | | H02J 17/00 340/870.16 |
| 6,556,142 B2 | 4/2003 | Dunstan | | H04L 12/2803 340/602 |
| 6,748,808 B2 * | 6/2004 | Lam | | G01N 29/0609 73/622 |
| 6,950,768 B2 * | 9/2005 | Freund, Jr. | | G01D 3/08 702/89 |
| 7,252,015 B2 * | 8/2007 | Konzelmann | | G01F 1/662 73/861.25 |
| 7,304,587 B2 * | 12/2007 | Boaz | | H04Q 9/00 340/870.02 |
| 7,400,264 B2 * | 7/2008 | Boaz | | G01D 4/004 340/870.01 |
| 7,762,118 B2 * | 7/2010 | Buchanan | | G01F 1/662 73/1.16 |
| 7,796,466 B2 * | 9/2010 | Combee | | G01V 1/22 367/134 |
| 8,103,461 B2 * | 1/2012 | Glaser | | A61B 5/087 702/45 |
| 8,170,812 B2 * | 5/2012 | Straub, Jr. | | G01F 25/0007 702/100 |
| 8,220,484 B2 * | 7/2012 | Howitt | | E03F 7/00 137/551 |
| 8,365,601 B2 * | 2/2013 | Minachi | | G01B 17/02 73/602 |
| 8,422,337 B2 * | 4/2013 | Su | | H04B 11/00 367/134 |
| 8,489,342 B2 * | 7/2013 | Dugger | | G01F 1/667 702/45 |
| 8,700,344 B2 * | 4/2014 | Wilson | | G01F 1/66 702/48 |
| 8,701,501 B2 * | 4/2014 | Miyata et al. | | 73/861.18 |
| 8,955,392 B2 * | 2/2015 | Liu | | G01F 1/66 73/861.28 |
| 8,978,476 B2 * | 3/2015 | Ao | | G01N 29/28 73/617 |
| 9,080,908 B2 * | 7/2015 | Yoder | | G01F 1/76 |
| 9,219,955 B2 * | 12/2015 | Imran | | H04R 1/44 |
| 9,255,910 B2 * | 2/2016 | Volker | | G01B 17/02 |
| 2003/0101804 A1 * | 6/2003 | Zanker | | G01F 1/667 73/105 |
| 2012/0250461 A1 * | 10/2012 | Millot | | H04B 11/00 367/82 |

OTHER PUBLICATIONS

Rose, Josehp L., "Ultrasonic Guided Waves in Structural Health Monitoring," Key Engineering Materials, vols. 270-273 (2004), pp. 14-22.

* cited by examiner

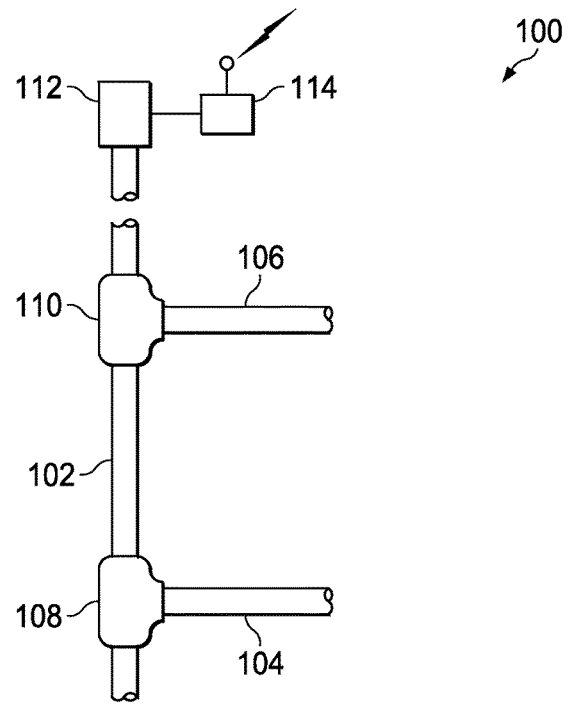
FIG. 1
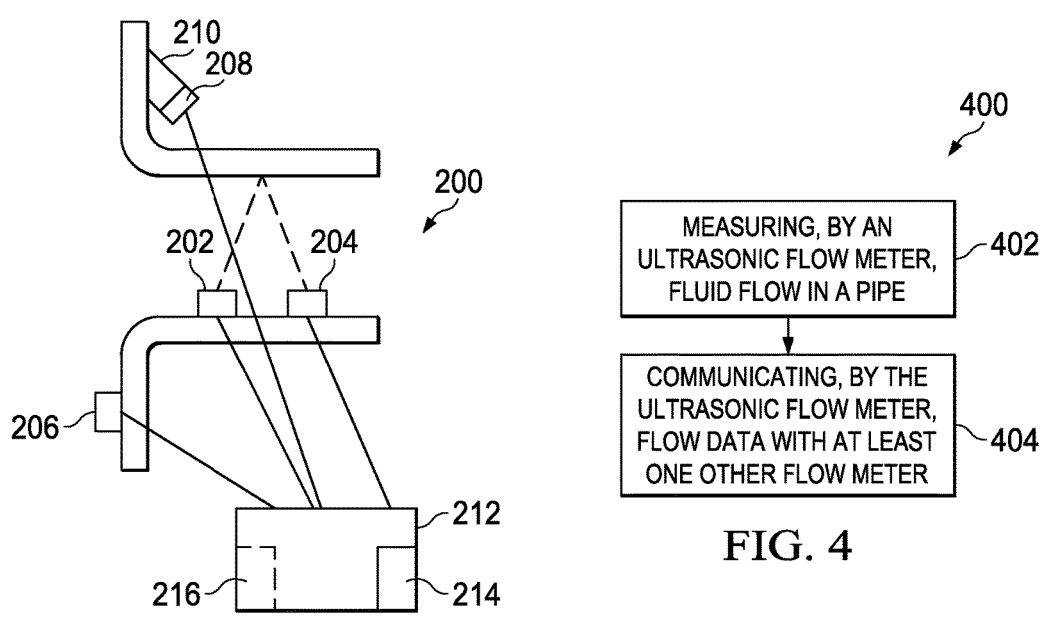
FIG. 2
FIG. 4

ULTRASONIC FLOW METER

This application claims the benefit of U.S. Provisional Application No. 61/623,229 filed Apr. 12, 2012, which is hereby incorporated by reference.

BACKGROUND

For many water and gas utilities, water and gas meters are mechanical, and they are typically read manually once a month. Water and gas utilities are transitioning toward automated measurement and communication of water and gas usage. There is a need for improved electronic water and gas meters with automatic communication of usage.

BRIEF DESCRIPTION OF THE DRAWINGS

FIG. 1 is a block diagram illustrating an example embodiment of a pipeline system for distributing a fluid or gas.

FIG. 2 is a block diagram illustrating additional detail for a pipe joint (illustrated in FIG. 1) with an ultrasonic metering system.

FIG. 4 is a flow chart illustrating an example embodiment of a method.

DETAILED DESCRIPTION

Figure 3A:
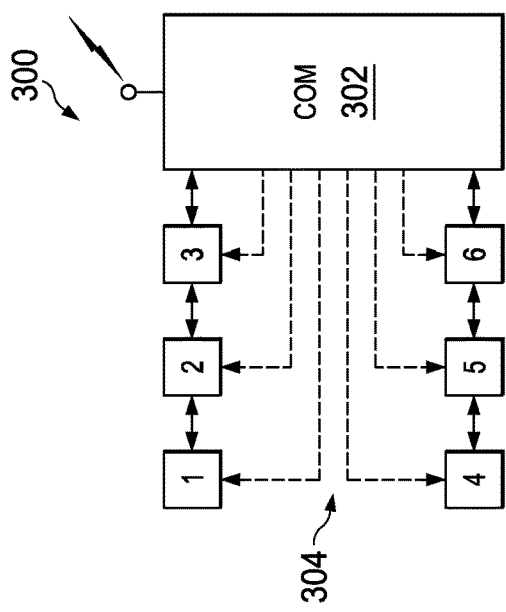
FIG. 3A is a block diagram of an example embodiment of a network of flow meters.

One known technology for measuring fluid velocity is ultrasound. Ultrasound velocity meters may be attached externally to pipes, and fluid velocity may be measured by time of flight of an ultrasonic signal through the fluid, or by measuring the ultrasonic Doppler effect, or by other ultrasound signal processing techniques. Fluid flow may be measured by multiplying fluid velocity by the interior area of a pipe. Cumulative fluid volume may be measured by integrating fluid flow over time. Separately, there have been studies using ultrasound to communicate through water pipes. In general, these are independent techniques. That is, the ultrasound parameters (for example, frequency) for a transducer optimized for fluid velocity measurement are typically not optimal for communication and vice versa. In the following discussion, a metering system may use the same ultrasonic transducers for both fluid velocity measurement and for communication. Optionally, the metering system may also detect leaks, pipe corrosion, and cracks in a pipe. Optionally, the metering system may also receive a wireless or ultrasonic time-synchronization signal.

FIG. 1 illustrates a pipeline system 100 for delivering a fluid (for example, water or natural gas). In FIG. 1, a main distribution pipe 102 delivers a fluid to branch pipes 104 and 106 that need to be metered. In the example of FIG. 1, flow meters are built into T-junctions 108 and 110. For example, a flow meter built into T-junction 108 measures the flow of fluid into pipe 104. Note that a T-junction is used only as an example and the flow meters may be installed within a pipe, within other types of junctions, or externally.

The pipeline system 100 may be located, for example, in a utility tunnel in the interior of a building or in the basement of a building. Alternatively, the pipeline system 100 may be located, for example, in an underground conduit or utility tunnel, perhaps under a street or within a utility right-of-way. Alternatively, the pipeline system 100 may be buried underground, for example, within a suburban neighborhood, or in a turf sprinkler system or other irrigation system. In general, the pipeline system 100 may be located such that electronic communication and in particular wireless communication from flow meters along the pipeline system 100 may be difficult at times. In particular, attenuation of wireless signals inside the ground is 20 -30 dB/m, depending on moisture content. As will be described in more detail below, metering data in the example pipeline system 100 may be relayed point-to-point along the pipe 102 until eventually reaching a communications system that can communicate aggregate metering data to a utility company. In the example of FIG. 1, each flow meter can communicate with at least one other flow meter, or with a communications system. For example, the flow meter in T-junction 108 may transmit its metering data along pipe 102 to the flow meter in T-junction 110. The flow meter in T-junction 110 in turn may act as a relay, transmitting the metering data from the T-junction 108, along with its own metering data, further along the distribution pipe 102. This may continue from flow meter to flow meter until at some point, aggregate flow data is sent to a utility company. In FIG. 1, element 112 (which may be a flow meter, or it may just be an ultrasonic communications link) receives metering data from at least one flow meter and sends that data to a communications system 114. The communications system 114 may then send aggregate metering data wirelessly, or over telephone land lines, or over a computer network such as the Internet, to a utility company. Note that in the example of FIG. 1, the flow meters are depicted as being arranged along a single linear pipeline 102. In general however, the flow meters and pipes may be configured in a mesh network topology, where one flow meter may act as a relay for multiple neighboring flow meters and communicate the aggregate information to subsequent flow meters. In addition, optional communications repeaters (not illustrated) may be used where flow meters are spaced too far apart for meter-to-meter communication.

FIG. 2 illustrates a cross section of an example embodiment of a T-junction (FIG. 1, 108, 110) that includes an ultrasonic flow meter 200. In the example of FIG. 2, two ultrasonic transducers 202 and 204 are attached to the inside wall of the T-junction. The two ultrasonic transducers 202 and 204 are connected through the wall of the T-junction to a controller 212. Controller 212 contains driver circuitry and receiver circuitry for the ultrasonic transducers, a microprocessor or microcontroller, and at least one battery 214. Additional optional ultrasonic transducers and communications elements will be described later below.

In the example of FIG. 2, the ultrasonic transducers 202 and 204 are placed inside the walls of the pipe. Alternatively, they may be placed outside the walls. However, in the case of water, the signal strength in water for direct transducer-water interface may be up to three orders of magnitude greater than the signal strength resulting from an ultrasonic transducer external to a metal pipe wall, and up to six orders of magnitude greater than the signal strength resulting from an ultrasonic transducer external to a plastic pipe wall. In the example of FIG. 2, the two ultrasonic transducers 202 and 204 are placed on the same side of the pipe. Alternatively, ultrasonic transducers may be placed on opposite walls. There may be more than two ultrasonic transducers arranged in a variety of three-dimensional topologies. There also may be acoustic reflecting surfaces.

The ultrasonic transducers may alternate roles as transmitter and receiver for measuring fluid velocity. For example, ultrasonic transducer 202 may transmit and ultrasonic transducer 204 may receive, and then ultrasonic transducer 204 may transmit and ultrasonic transducer 204 may receive. Controller 212 may measure the time-of-flight of the ultrasonic pressure waves from the transmitter to the receiver. Flowing fluid in the pipe will cause the downstream time-of-flight to be slightly different than the upstream time of flight, and that slight difference may be used to measure the velocity of the fluid. Time-of-flight may be measured directly by measuring the time from when a signal is transmitted until a signal is received. This may be achieved by a zero-crossing detector that gets triggered by a signal-level threshold. The zero-crossing detector may be implemented using a time-to-digital converter (TDC). However, the received signal may be noisy, causing some timing inaccuracy due to the signal-level threshold. Alternatively, an analog-to-digital converter may be used to quantize and store the whole waveform. Then, cross-correlation may be used to measure how much one waveform is shifted in time relative to another waveform. The transmitted waveform may be cross-correlated with the received waveform, which uses the entire waveforms and therefore does not depend on just the signal level of the leading portion of the received waveform.

In addition to measuring fluid velocity, one of the ultrasonic transducers (202, 204) may be used to transmit data along the pipes to another flow meter or to a communications system. One of the ultrasonic transducers (which may be the same as the one used for data transmission) may be used to receive data from another flow meter. The ultrasonic pressure waves will travel along the fluid/pipe system. That is, the signal may travel by bulk wave propagation in the fluid and in the wall of the pipe. Experiments have shown that signal strength goes down if the signal is blocked from traveling in the fluid but is allowed to travel within the wall of the pipe, and the signal strength goes down even more if the signal is blocked from traveling within the wall of the pipe but is allowed to travel just within the fluid.

An ultrasound transducer (202, 204) may be used for measuring fluid velocity and also for data communication. For accurate measurement of fluid or gas velocity, especially at low velocities, a high ultrasound frequency is needed (>1 MHz). Typically, ultrasound transducers have a resonant frequency and they can be operated only at frequencies close to their resonant frequency. Fluids attenuate ultrasound signals more at higher frequencies than at lower frequencies. Typically, for ultrasonic communication, low frequencies (for example, 40 KHz) are used to maximize communication distance. Typically, an ultrasonic transducer intended for operation at frequencies over 1 MHz would not be suitable for operation at 40 KHz. However, a network of flow meters in a building or even in a suburban area may be spaced sufficiently close together to enable a high frequency to be used for both fluid velocity measurement and for communication. With an ultrasound transducer being operated at 1.3 MHz for both velocity measurement and communication, and with the transducer directly coupled to water, communication distances of 20-30 meters for water in a galvanized iron pipe are feasible. In general, ultrasound signals are stronger in water than in air or gas, and ultrasound signals are stronger in metal pipes than in plastic pipes. Communication distances for gas, or for polyvinylchloride (PVC) pipes may be less than communication distances for water in a galvanized pipe. Ultrasonic repeaters may be used where necessary. Alternatively, where necessary, communication distances may also be extended substantially by using a separate lower frequency transducer for communication. In FIG. 2, an optional separate ultrasonic transducer 206 is used just for communication at a frequency lower than the frequency used by the ultrasonic transducers 202 and 204 used for fluid velocity measurement.

Figure 3B:
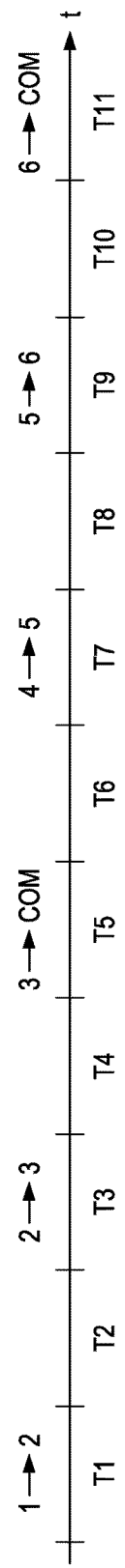
FIG. 3B is a timeline illustrating an example embodiment of time multiplexed communications in the network of flow meters of FIG. 3A.

If the same frequency is used for flow measurement and for communication, then time multiplexing may be needed to avoid interference between flow measurement and communication, and to ensure that flow meters do not transmit simultaneously. FIGS. 3A and 3B illustrate an example of time multiplexing. In FIG. 3A, an example network 300 of flow meters has six flow meters, numbered 1-6. Flow meters 3 and 6 transmit aggregate flow data to a communications system 302. FIG. 3B illustrates a time line of data transmission and fluid flow measurement. Time intervals are designated as T1 through T11 During each odd-numbered time interval, data communication takes place. During each even-numbered time interval, the flow meters measure fluid flow. During time interval T1, flow meter 1 transmits its flow data to flow meter 2. During time interval T3, flow meter 2 transmits its flow data, along with the flow data from flow meter 1, to flow meter 3. During time interval T5, flow meter 3 transmits its flow data, along with the flow data from flow meters 1 and 2, to the communications system 302. Likewise, data from flow meter 4 to flow meter 5 is transmitted during time interval T7, aggregate data from flow meter 5 is transmitted to flow meter 6 during time interval T9, and aggregate data from flow meter 6 is transmitted to the communications system 302 during time interval T11 After time interval T11 the communications system 302 transmits aggregate data from all six flow meters to a utility company.

At least coarse time synchronization between flow meters may have to be implemented so that each flow meter will measure flow during times allocated for measurement and each flow meter will transmit or receive data during times allocated for communication. When the flow meters are first installed the internal clocks used by the microprocessors or microcontrollers may be sufficiently accurate for time-multiplexe communication for some period of time. However, as will be discussed further below, the batteries for the flow meters are expected to last for more than ten years, so eventually some automatic time synchronization may be required. For example, periodically (for example, once a week or once a month), the time-multiplexed meter-to-meter communication depicted in FIG. 3B may be reversed and a time synchronization marker may be sent during the communication time intervals. For example, during time interval T11 the communications system 302 may send a time marker to flow meter 6, and flow meter 6 may adjust its internal clock to synchronize to the time marker. During time interval T9, flow meter 6 may then send a time marker to flow meter 5 and flow meter 5 may adjust its internal clock, and so forth.

Alternatively, wireless radio-frequency (RF) signals may be used for synchronization. The battery operated flow meters need to be low power, so it may be impractical for a flow meter to transmit a high-power wireless RF signal through structures or through the ground. However, it may be practical for a flow-meter to receive a wireless RF signal from a high-power transmitter, even if the signal has been attenuated by structures or by the ground. A high-power transmitter may be connected to an AC main, and may be located above ground or in a building, and can transmit at a much higher power than a battery powered flow meter. The high-power transmitter may be used only for time synchronization of the flow meters. In FIG. 2, the controller 212 may optionally include a wireless RF receiver 216 for time synchronization. In FIG. 3A, dashed lines 304 depict a time synchronization signal from the communications system 302 to each flow meter. During some time intervals dedicated for communication, perhaps staggered in time, the communications system 302 may send a wireless RF time-synchronization signal. Each flow meter may then periodically listen for the wireless RF time synchronization signal during the appropriate communications time intervals.

Ultrasound communications may use any of the techniques used by electronic communication for transmitting data by modulating a carrier frequency. Examples include Frequency Shift Keying (FSK), Binary Phase Shift Keying (BPSK), and Quadrature Phase Shift Keying (QPSK). Redundancy and error correction codes may be included to reduce transmission errors.

A typical measurement cycle for automatic water and gas metering is one flow measurement every two seconds with an averaging over 20 seconds. For an ultrasonic flow meter with communication as in FIG. 2, fluid volume measurements may be summed, and a total fluid volume measurement performed over a few minutes, or a day, or a week, or a month may be communicated to the utility company. Given the relatively infrequent measurement activity and communication activity, the average current is very low, and it is feasible to power a flow meter for more than twenty years from a battery without recharging. In particular, a 3.0 Amp-hour battery may be sufficient to power an ultrasonic flow meter for about twenty years. There are commercially available AA 2.4 Amp-hour Lithium-based batteries that have proven lifetimes that are greater than ten years at average current levels that are greater than the current required by an ultrasound-based flow meter. Given the very low average current requirements of an ultrasound-based flow meter, two parallel commercially available long-life low-current batteries should have more than enough capacity for a lifetime substantially greater than ten years.

Ultrasonic flow meters with frequent communication enable detection of problems that may not be detected with meters that are checked infrequently. For example, two flow meters on the same pipe may be used for leak detection. If flow is higher at an up-stream meter compared to a downstream meter then fluid may be leaking out somewhere between the meters. As another example, flow in a pipe dedicated to an overhead fire suppression system may indicate that overhead sprinklers are flowing, possibly indicating a fire and/or imminent water damage. As another example, flow in an irrigation system for a long period of time or at an unusual time may indicate a leak or a broken pipe. Similarly, an unusually high flow rate over a long period of time during freezing weather may indicate a pipe that has burst from freezing.

Given the proper wavelength and incidence angle for the ultrasonic signal, the interior and exterior surfaces of the wall of a pipe may act as an acoustic waveguide, where guided waves may travel long distances without substantial attenuation. These guided waves depend on constructive interference of reflections from the surfaces of the walls of the pipe. Just as an electrical impedance mismatch in an electrical waveguide results in an electrical signal reflection, an acoustic impedance mismatch in an acoustic waveguide results in an acoustic signal reflection. In particular, a small crack in the wall of the pipe will result in a partially reflected signal, and a rough corroded surface will result in many small reflected signals. A transducer may transmit a signal, and then measure the resulting reflections. The time for a large reflection to return to the transducer may be used as a measure of distance to a discontinuity in the pipe wall, such as a crack. Overall noise level in the reflected signals over multiple transit times may be used as a measure of corrosion. Alternatively, shortly after installation of a flow meter, the flow meter may store a calibration profile of reflected signal strength as a function of time. Then, periodically, the reflection profile may be measured again and compared to the calibration profile. Significant changes in the profile may indicate corrosion or cracks. In FIG. 2, an optional transducer 208 is mounted on a wedge 210 to induce ultrasound waveforms at the proper incidence angle for guided waves for corrosion measurement and crack detection.

In general, guided waves travel longer distances than the bulk wave propagation discussed earlier, so an ultrasonic transducer used for guided waves may also be used for communication over longer distances. A specific type of waveform is needed for guided waves, and this waveform may be modulated for communication between transducers.

Alternatively, in FIG. 2, the ultrasonic transducers 202 and 204 may comprise transducer arrays. Ultrasound transducers may comprise an array of very small elements mounted onto very thin membranes, where each area of the array has a very high resonant frequency. Examples include Piezoelectric Micromachined Ultrasound Transducers (PMUT) and Capacitive Micromachined Ultrasound Transducers (CMUT). One dimension of each resonant area may be on the order of 10's of micrometers, and the resonant frequency may be a few MHz. In general, the incidence angle required for guided waves is different than the reflection angle needed for fluid velocity measurement. However, using phased excitation, ultrasound arrays may be used to transmit an ultrasound wave in a controlled direction. Ultrasound arrays may steer an ultrasound wave in one direction for fluid velocity measurement, and in a different direction for guided waves for corrosion measurement, crack detection, and communication. Therefore, ultrasound arrays may be used for fluid velocity measurement, and for guided waves for corrosion measurement and crack detection, and for ultrasonic guided wave communication, all at the same frequency.

FIG. 4 illustrates a method 400 for measuring fluid flow and communicating the fluid flow data. At step 402, an ultrasonic flow meter measures fluid flow in a pipe. At step 404, the ultrasonic flow meter communicates flow data with at least one other flow meter.

What is claimed is:
1. A pipeline system, comprising:
a fluid conduit that includes a first pipe portion having a first wall with a first interior surface and defining a first flow path and a second pipe portion having a second wall with a second interior surface and defining a second flow path, wherein the first pipe portion and second pipe portion are arranged in a substantially perpendicular arrangement with the first flow path and second flow path being in fluid connection; and
a flow meter including:
a controller;
a first ultrasonic transducer coupled to the controller and enclosed within the first pipe portion;
a second ultrasonic transducer coupled to the controller and enclosed within the first pipe portion, wherein the first ultrasonic transducer is configured to transmit first ultrasonic waves having a first frequency in a first direction along the first flow path when a fluid is present in the fluid conduit and the second ultrasonic transducer is configured to receive the first ultrasonic waves when transmitted by the first ultrasonic transducer;
a third ultrasonic transducer coupled to the controller and enclosed within the second pipe portion;

wherein the controller is configured to produce a flow rate measurement in response to the receiving of the first ultrasonic waves by the second ultrasonic transducer;

wherein the first ultrasonic transducer is further configured to transmit second ultrasonic waves having a second frequency into at least one of the first wall of the first pipe portion or the second wall of the second pipe portion, the second ultrasonic waves representing first communication data;

wherein the third ultrasonic transducer is configured to transmit third ultrasonic waves into at least one of the first wall of the first pipe portion or the second wall of the second pipe portion, wherein the third ultrasonic waves have a third frequency that is lower than the first frequency and represents second communication data; and wherein at least one of the first communication data or the second communication data includes the flow rate measurement produced by the controller.

2. The pipeline system of claim 1, wherein the controller is configured to time multiplex the transmission of the first ultrasonic waves and of the second ultrasonic waves by the first ultrasonic transducer.

3. The pipeline system of claim 1, wherein the first ultrasonic transducer and the second ultrasonic transducer are each arranged on the first interior surface of the first wall of the first pipe portion.

4. The pipeline system of claim 3, wherein the first and second ultrasonic transducers are arranged at different axial positions but at the same radial position with respect to the first flow path on the first interior surface of the first wall of the first pipe portion.

5. The pipeline system of claim 3, wherein the first and second ultrasonic transducers are arranged at different axial positions and different radial positions with respect to first flow path on the first interior surface of the first wall of the first pipe portion.

6. The pipeline system of claim 1, wherein the first frequency and second frequency are substantially equal.

7. The pipeline system of claim 1, wherein the first frequency and second frequency are both approximately 1.3 Mhz.

8. The pipeline system of claim 1, wherein the third frequency is approximately 40 Khz.

9. The pipeline system of claim 1, wherein the flow meter comprises a fourth ultrasonic transducer coupled to the controller and arranged on an exterior surface of the fluid conduit, wherein the fourth ultrasonic transducer is configured to transmit fifth ultrasonic waves at an incidence angle suitable for detection of cracks in the fluid conduit.

10. The pipeline system of claim 9, wherein the second wall of the second pipe portion has a second exterior surface and the fourth ultrasonic transducer is arranged on the second exterior surface of the second wall of the second pipe portion.

11. The pipeline system of claim 1, wherein the flow meter comprises a fourth ultrasonic transducer coupled to the controller and arranged on an exterior surface of the fluid conduit, wherein the fourth ultrasonic transducer is configured to transmit fifth ultrasonic waves at an incidence angle suitable for measuring corrosion in the fluid conduit.

12. The pipeline system of claim 11, wherein the second wall of the second pipe portion has a second exterior surface and the fourth ultrasonic transducer is arranged on the second exterior surface of the second wall of the second pipe portion.

13. The pipeline system of claim 1, wherein the second ultrasonic transducer is configured to transmit sixth ultrasonic waves having the first frequency in a second direction opposite the first direction along the first flow path when the fluid is present in the fluid conduit and the first ultrasonic transducer is configured to receive the sixth ultrasonic waves when transmitted by the second ultrasonic transducer.

14. The pipeline system of claim 1, wherein the first ultrasonic transducer comprises a transducer array.

15. A pipeline system, comprising:
a fluid conduit that includes:
a first pipe portion having a first wall with a first interior surface and a first exterior surface and defining a first flow path; and
a second pipe portion having a second wall with a second interior surface and a second exterior surface and defining a second flow path, wherein the first pipe portion and second pipe portion are arranged in a substantially perpendicular arrangement with the first flow path and second flow path being in fluid connection; and
a flow meter including:
a controller;
a first ultrasonic transducer coupled to the controller and enclosed within the first pipe portion;
a second ultrasonic transducer coupled to the controller and enclosed within the first pipe portion, wherein the first ultrasonic transducer is configured to transmit first ultrasonic waves having a first frequency in a first direction along the first flow path when a fluid is present in the fluid conduit and the second ultrasonic transducer is configured to receive the first ultrasonic waves when transmitted by the first ultrasonic transducer;
a third ultrasonic transducer coupled to the controller and arranged on the second exterior surface of the second wall of the second pipe portion;
wherein the controller is configured to produce a flow rate measurement in response to the receiving of the first ultrasonic waves by the second ultrasonic transducer;
wherein the first ultrasonic transducer is further configured to transmit second ultrasonic waves having a second frequency into at least one of the first wall of the first pipe portion or the second wall of the second pipe portion, the second ultrasonic waves representing communication data that includes the flow rate measurement produced by the controller; and
wherein the third ultrasonic transducer is configured to transmit third ultrasonic waves at an incidence angle suitable for measuring corrosion in the fluid conduit.

16. A pipeline system, comprising:
a fluid conduit that includes:
a first pipe portion having a first wall with a first interior surface and a first exterior surface and defining a first flow path; and
a second pipe portion having a second wall with a second interior surface and a second exterior surface and defining a second flow path, wherein the first pipe portion and second pipe portion are arranged in a substantially perpendicular arrangement with the first flow path and second flow path being in fluid connection; and
a flow meter including:
a controller;
a first ultrasonic transducer coupled to the controller and enclosed within the first pipe portion;

a second ultrasonic transducer coupled to the controller and enclosed within the first pipe portion, wherein the first ultrasonic transducer is configured to transmit first ultrasonic waves having a first frequency in a first direction along the first flow path when a fluid is present in the fluid conduit and the second ultrasonic transducer is configured to receive the first ultrasonic waves when transmitted by the first ultrasonic transducer;

a third ultrasonic transducer coupled to the controller and arranged on the second exterior surface of the second wall of the second pipe portion;

wherein the controller is configured to produce a flow rate measurement in response to the receiving of the first ultrasonic waves by the second ultrasonic transducer;

wherein the first ultrasonic transducer is further configured to transmit second ultrasonic waves having a second frequency into at least one of the first wall of the first pipe portion or the second wall of the second pipe portion, the second ultrasonic waves representing communication data that includes the flow rate measurement produced by the controller; and wherein the third ultrasonic transducer is configured to transmit third ultrasonic waves at an incidence angle suitable for detecting cracks in the fluid conduit.

\* \* \* \* \*